United States Patent
Haneda

(10) Patent No.: US 6,523,105 B1
(45) Date of Patent: Feb. 18, 2003

(54) RECORDING MEDIUM CONTROL DEVICE AND METHOD

(75) Inventor: Naoya Haneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/202,168

(22) PCT Filed: Apr. 16, 1998

(86) PCT No.: PCT/JP98/01754

§ 371 (c)(1),
(2), (4) Date: Apr. 15, 1999

(87) PCT Pub. No.: WO98/47065

PCT Pub. Date: Oct. 22, 1998

(30) Foreign Application Priority Data

Apr. 16, 1997 (JP) ............................................. 9-099199

(51) Int. Cl.$^7$ ............................................. G06F 12/00
(52) U.S. Cl. ........................ 711/209; 711/154; 711/219
(58) Field of Search ................................. 711/1, 5, 100, 711/103, 112, 202, 209, 154, 219, 156

(56) References Cited

U.S. PATENT DOCUMENTS

| | | | | |
|---|---|---|---|---|
| 5,144,692 A | * | 9/1992 | Baker et al. | 709/100 |
| 5,459,850 A | * | 10/1995 | Clay et al. | 703/24 |
| 5,465,338 A | * | 11/1995 | Clay | 710/316 |
| 5,469,548 A | * | 11/1995 | Callison et al. | 711/114 |
| 5,603,001 A | * | 2/1997 | Sukegawa et al. | 711/103 |
| 5,724,617 A | * | 3/1998 | Hirano et al. | 396/55 |

FOREIGN PATENT DOCUMENTS

| | | |
|---|---|---|
| JP | 62-251991 | 11/1987 |
| JP | 6-139140 | 5/1994 |
| JP | 7-200181 | 8/1995 |
| JP | 7-302176 | 11/1995 |
| JP | 8-77081 | 3/1996 |
| JP | 10-69520 | 3/1998 |

* cited by examiner

Primary Examiner—Matthew Kim
Assistant Examiner—Matthew D. Anderson
(74) Attorney, Agent, or Firm—Sonnenschein, Nath & Rosenthal

(57) ABSTRACT

An information recording/reproducing device includes a transfer control section for carrying out input/output of transfer data, a recording medium control section for carrying out writing to/reading from a recording medium, a file management section for managing a recorded file, and a CPU for carrying out control of each constituent element. The recording medium control section includes a page counter for counting the number of pages at the time of data transfer, and address register group for designating addresses, a control circuit which includes a pointer for selecting one effective address register and a control register for designating the type of control with respect to the recording medium and is adapted for transmitting/receiving a control signal to/from the transfer control section, the CPU and the recording medium, and a recording medium selection circuit for selecting recording medium pieces. Thus, it is possible to carry out high-speed data transfer by parallel control of the recording medium pieces, restrain overhead processing in data transfer, and carry out data transfer of higher versatility.

77 Claims, 12 Drawing Sheets

| SECTOR DATA | POINTER PAGE COUNTER | ADDRESS REGISTER | | | | | | | |
|---|---|---|---|---|---|---|---|---|---|
| | | p[0]* | p[1] | p[2] | p[3] | p[4] | p[5] | p[6] | p[7] |
| FS[1:0] | 23* | CBP[0:1:0]* | | | | | | | |
| FS[1:1] | 22 | | CBP[1:1:0]* | | | | | | |
| FS[1:2] | 21 | | | CBP[2:1:0]* | | | | | |
| FS[1:3] | 20 | CBP[0:1:1] | | | CBP[3:1:0]* | | | | |
| FS[1:4] | 19 | | CBP[1:1:1] | | | | | | |
| FS[1:5] | 18 | | | CBP[2:1:1] | | | | | |
| FS[1:6] | 17 | | | | CBP[3:1:1] | | | | |
| FS[1:7] | 16 | CBP[0:1:2] | | | | | | | |
| FS[1:8] | 15 | | CBP[1:1:2] | | | | | | |
| FS[1:9] | 14 | | | CBP[2:1:2] | | | | | |
| FS[1:10] | 13 | | | | CBP[3:1:2] | | | | |
| FS[1:11] | 12 | CBP[0:1:3] | | | | | | | |
| FS[1:12] | 11 | | CBP[1:1:3] | | | | | | |
| FS[1:13] | 10 | | | CBP[2:1:3] | | | | | |
| FS[1:14] | 9 | | | | CBP[3:1:3] | | | | |
| FS[1:15] | 8 | CBP[0:2:0] | | | | | | | |
| FS[1:16] | 7 | | CBP[1:2:0] | | | | | | |
| FS[1:17] | 6 | | | CBP[2:2:0] | | | | | |
| FS[1:18] | 5 | | | | CBP[3:2:0] | | | | |
| FS[1:19] | 4 | CBP[0:2:1] | | | | | | | |
| FS[1:20] | 3 | | CBP[1:2:1] | | | | | | |
| FS[1:21] | 2 | | | CBP[2:2:1] | | | | | |
| FS[1:22] | 1 | | | | | | | | |

FIG.8

| BLOCK ADDRESS | POINTER / PAGE COUNTER | ADDRESS REGISTER ||||||||
|---|---|---|---|---|---|---|---|---|---|
| | | p[0]* | p[1] | p[2] | p[3] | p[4] | p[5] | p[6] | p[7] |
| CB[0:1] | 8* | CBP[0:1:0]* | | | | | | | |
| CB[1:1] | 7 | | CBP[1:1:0]* | | | | | | |
| CB[2:1] | 6 | | | CBP[2:1:0]* | | | | | |
| CB[3:1] | 5 | | | | CBP[3:1:0]* | | | | |
| CB[0:2] | 4 | CBP[0:2:0] | | | | | | | |
| CB[1:2] | 3 | | CBP[1:2:0] | | | | | | |
| CB[2:2] | 2 | | | CBP[2:2:0] | | | | | |
| CB[3:2] | 1 | | | | CBP[3:2:0] | | | | |

| RECORDING MEDIUM PIECE 103a | | RECORDING MEDIUM PIECE 103b | | RECORDING MEDIUM PIECE 103c | | RECORDING MEDIUM PIECE 103d | |
|---|---|---|---|---|---|---|---|
| CBP[0:3:3] | FS[2:12] | CBP[1:3:3] | | CBP[2:3:3] | | CBP[3:3:3] | |
| CBP[0:3:2] | FS[2:8] | CBP[1:3:2] | FS[2:9] | CBP[2:3:2] | FS[2:10] | CBP[3:3:2] | FS[2:11] |
| CBP[0:3:1] | FS[2:4] | CBP[1:3:1] | FS[2:5] | CBP[2:3:1] | FS[2:6] | CBP[3:3:1] | FS[2:7] |
| CBP[0:3:0] | FS[2:0] | CBP[1:3:0] | FS[2:1] | CBP[2:3:0] | FS[2:2] | CBP[3:3:0] | FS[2:3] |
| CBP[0:2:3] | FS[1:20] | CBP[1:2:3] | FS[1:21] | CBP[2:2:3] | FS[1:22] | CBP[3:2:3] | |
| CBP[0:2:2] | FS[1:14] | CBP[1:2:2] | FS[1:15] | CBP[2:2:2] | FS[1:16] | CBP[3:2:2] | FS[1:17] |
| CBP[0:2:1] | FS[1:8] | CBP[1:2:1] | FS[1:9] | CBP[2:2:1] | FS[1:10] | CBP[3:2:1] | FS[1:11] |
| CBP[0:2:0] | FS[1:2] | CBP[1:2:0] | FS[1:3] | CBP[2:2:0] | FS[1:4] | CBP[3:2:0] | FS[1:5] |
| CBP[0:1:3] | | CBP[1:1:3] | | CBP[2:1:3] | | CBP[3:1:3] | FS[1:19] |
| CBP[0:1:2] | | CBP[1:1:2] | | CBP[2:1:2] | FS[1:18] | CBP[3:1:2] | FS[1:13] |
| CBP[0:1:1] | | CBP[1:1:1] | | CBP[2:1:1] | FS[1:12] | CBP[3:1:1] | FS[1:7] |
| CBP[0:1:0] | | CBP[1:1:0] | | CBP[2:1:0] | FS[1:6] | CBP[3:1:0] | FS[1:1] |
| CBP[0:0:3] | | CBP[1:0:3] | FS[0:9] | CBP[2:0:3] | FS[1:0] | CBP[3:0:3] | FS[0:11] |
| CBP[0:0:2] | | CBP[1:0:2] | FS[0:6] | CBP[2:0:2] | FS[0:10] | CBP[3:0:2] | FS[0:8] |
| CBP[0:0:1] | | CBP[1:0:1] | FS[0:3] | CBP[2:0:1] | FS[0:7] | CBP[3:0:1] | FS[0:5] |
| CBP[0:0:0] | | CBP[1:0:0] | FS[0:0] | CBP[2:0:0] | FS[0:4] | CBP[3:0:0] | FS[0:2] |

FIG.11

| SECTOR DATA | POINTER / PAGE COUNTER | p[0] | p[1] | p[2] | p[3] | p[4] | p[5] | p[6] | p[7] |
|---|---|---|---|---|---|---|---|---|---|
| FS[1:0] | 23* | CBP[2:1:0]* | | | | | | | |
| FS[1:1] | 22 | | CBP[3:1:0]* | | | | | | |
| FS[1:2] | 21 | | | CBP[0:2:0]* | | | | | |
| FS[1:3] | 20 | | | | CBP[1:2:0]* | | | | |
| FS[1:4] | 19 | | | | | CBP[2:2:0]* | | | |
| FS[1:5] | 18 | | | | | | CBP[3:2:0]* | | |
| FS[1:6] | 17 | CBP[2:1:1] | | | | | | | |
| FS[1:7] | 16 | | CBP[3:1:1] | | | | | | |
| FS[1:8] | 15 | | | CBP[0:2:1] | | | | | |
| FS[1:9] | 14 | | | | CBP[1:2:1] | | | | |
| FS[1:10] | 13 | | | | | CBP[2:2:1] | | | |
| FS[1:11] | 12 | | | | | | CBP[3:2:1] | | |
| FS[1:12] | 11 | CBP[2:1:2] | | | | | | | |
| FS[1:13] | 10 | | CBP[3:1:2] | | | | | | |
| FS[1:14] | 9 | | | CBP[0:2:2] | | | | | |
| FS[1:15] | 8 | | | | CBP[1:2:2] | | | | |
| FS[1:16] | 7 | | | | | CBP[2:2:2] | | | |
| FS[1:17] | 6 | | | | | | CBP[3:2:2] | | |
| FS[1:18] | 5 | CBP[2:1:3] | | | | | | | |
| FS[1:19] | 4 | | CBP[3:1:3] | | | | | | |
| FS[1:20] | 3 | | | CBP[0:2:3] | | | | | |
| FS[1:21] | 2 | | | | CBP[1:2:3] | | | | |
| FS[1:22] | 1 | | | | | CBP[2:2:3] | | | |

ADDRESS REGISTER

| BLOCK ADDRESS | POINTER / PAGE COUNTER | ADDRESS REGISTER | | | | | | | |
|---|---|---|---|---|---|---|---|---|---|
| | | p[0]* | p[1] | p[2] | p[3] | p[4] | p[5] | p[6] | p[7] |
| CB[2:1] | 6* | CBP[2:1:0]* | | | | | | | |
| CB[3:1] | 5 | | CBP[3:1:0]* | | | | | | |
| CB[0:2] | 4 | | | CBP[0:2:0]* | | | | | |
| CB[1:2] | 3 | | | | CBP[1:2:0]* | | | | |
| CB[2:2] | 2 | | | | | CBP[2:2:0]* | | | |
| CB[3:2] | 1 | | | | | | CBP[3:2:0]* | | |

FIG.12

RECORDING MEDIUM CONTROL DEVICE AND METHOD

TECHNICAL FIELD

This invention relates to recording medium control device and method suitably used for carrying out high-speed and flexible control of write and read with respect to various recording medium pieces.

BACKGROUND ART

The present Assignee has proposed a device which can provide various information by transferring information such as sounds, images, characters, and programs from an information providing device (information transfer device) to a recording device or a recording/reproducing device having a semiconductor memory or the like enclosed therein, in the Japanese Publication of Unexamined Patent Application No. Hei 6-131371, No. Hei 6-215010, and No. Hei 6-301601.

FIG. 1 is a view showing appearance of a conventional information recording/reproducing device proposed in the above-mentioned publications. This information recording/reproducing device 200A has a connection terminal 201 for connection with an information providing device, not shown, and is capable of copying information from the information providing device through the connection terminal 201 to a recording medium provided in the information recording/reproducing device 200A. Although the type of the recording medium is not particularly limited, it is convenient to use a semiconductor memory which enables high-speed copying and which is randomly accessible and excellent in portability.

This information recording/reproducing device 200A is provided with a display unit 202 for displaying characters and images, and a function selecting section 203 constituted by pushbutton switches. Since this information recording/reproducing device 200A displays the contents of information recorded in the recording medium onto the display unit 202, the user can selectively reproduce desired information by using the function selecting section 203.

The contents of information provided from the information providing device includes text information, audio information, video information, and computer programs, and is not particularly limited. Reproduction of a program means execution of the program. However, in this case, the user may input information at the time of execution, if necessary. In the case where reproduction signals are text information or video signals, the signals can be displayed on the display unit 202 constituted by, for example, a liquid crystal display device. In addition, in the case of audio information, the information can be outputted to an earphone 204. Although not shown, a speaker may be provided in place of or in addition to the earphone 204, or an output terminal for reproduction signals may be provided to enable connection with an external display device or speaker.

FIG. 2 is a view showing appearance of another conventional information recording/reproducing device proposed in the above-mentioned publications. An information recording/reproducing device 200B shown in FIG. 2 is constituted by splitting the information recording/reproducing device 200A of FIG. 1 into an information recording device 210 and an information reproducing device 220. In this information recording/reproducing device 200B, information from the information recording device 210 can be transmitted and reproduced on the side of the information reproducing device 220, by inserting the information recording device 210 into an insertion/ejection port 221 of the information reproducing device 220.

For reproduction, data and control signals must be transmitted between the information recording device 210 and the information reproducing device 220. Therefore, a connection terminal 212 for connection with the information reproducing device 220 is provided on the information recording device 210, and a connection terminal corresponding to this connection terminal 212 is provided on the information reproducing device 220, so that these two connection terminals are connected with each other in the state where the information recording device 210 is mounted in the information reproducing device 220.

The information recording device 210 has two connection terminals, that is, a connection terminal 211 for connection with the information providing device and the connection terminal 212 for connection with the information reproducing device. However, a single terminal may be used in a switching manner.

The information recording device 210 can be constituted only by a recording medium. By using only the recording medium, a portable information recording device of small size and light weight is provided. In this case, control of reading from the recording medium and writing to the recording medium is carried out on the side of the information reproducing device 200 or the information providing device.

FIG. 3 is a view showing appearance of a conventional information providing device proposed in the above-mentioned publication. This information providing device 230 has a display unit 231 for displaying the contents and price of available information, and an output selecting section 232 for the user to select desired information. By inserting the information recording device 210 shown in FIG. 2 into an insertion/ejection port 233 of the information providing device 230, and then operating the output selecting section 232 to select desired information with reference to information displayed on the display unit 231, the user can copy the desired information to the information recording device 210. Also, the user can copy information by connecting a connection terminal provided on the information providing device 230 to the connection terminal 201 of the information recording/reproducing device 200A shown in FIG. 1.

The information providing device 230 has a recording medium storing therein information to be provided, and an information copy control section (not shown) for writing read-out information to the information recording device 210 and the information recording/reproducing device 200A. There may also be provided a structure in which the information providing device 230 and an information providing center, not shown, are connected to each other via a wire or a wireless communication section to provide information desired by the user through the communication section. By providing such structure, the recording medium need not be provided in the information providing device 230. Even in the case where the recording medium is provided in the information providing device 230, by updating the information stored in the recording medium through the communication section, the latest information can be provided while the communication cost is restrained.

FIG. 4 is a view showing appearance of another conventional information providing device proposed in the above-mentioned publications. This information providing device 240 has an insertion port 241 and an ejection port 242 for the information recording device 210 which are arranged away from each other at a certain distance. This information providing device 240 has a moving section, not shown, for transporting the information recording device 210 inserted from the insertion port 241, and after copying information to be provided to the inserted information recording device 210, the information providing device 240 ejects the information recording device 210 from the ejection port 242. A person H who wishes to obtain information can receive copied information while walking in a direction of A in FIG. 4. This information providing device 240 can quickly provide information to a number of people.

As a recording medium used in the case where the information recording/reproducing device needs to have portability, it is desired to use a non-volatile memory which does not require backup of information by a battery. That is, it is convenient to use the non-volatile memory since erasure of recorded information can be prevented. As such non-volatile memory, for example, an EEPROM (electrically erasable programmable read-only memory), described in Iwata, et al., "32 Mbits NAND flash memory," Electronic Materials, June 1995, pp.32–37, can be used.

Conventionally, there is also DMA (direct memory access) as a method for directly transferring data without using a CPU (central processing unit), and a DMA controller (hereinafter referred to as DMAC) is employed as a dedicated circuit for realizing this method. This method is used in the case where a large quantity of data needs to be transferred at a high speed, for example, in data transmission to an auxiliary memory device such as a hard disk drive or in image processing in which image data are handled.

FIG. 5 shows an example of the structure of the conventional information recording/reproducing device. Such example can be seen in the case where DMA transfer is carried out between an I/O device such as a hard disk controller or a SCSI (small computer system interface) and a memory such as a magnetic disk or an SRAM (static random access memory).

A DMAC 251 of an information recording/reproducing device 250 includes an address register p which indicates the address of a transfer destination such as a memory and in which increment (+1) is made for each data transfer, and a word counter c which calculates the number of words of transfer data and in which decrement (−1) is made for each data transfer. The initial values thereof are set by a CPU 252 prior to DMA transfer.

DMA transfer is started by a data transfer request from an I/O device 254. The I/O device 254 sends to the DMAC 251 a signal DREQ for requesting data transfer in order to carry out data transfer with the above-described information providing device through a data input/output terminal 255. On receiving this signal, the DMAC 251 sends to the CPU 252 a signal BUSREQ for requesting right of bus use in order to acquire the right of use of a bus, which is normally occupied by the CPU 252. On receiving this signal, the CPU 252 completes necessary processing such as interrupting execution of a program, and then sends back to the DMAC 251 a signal BUSACK indicating release of the bus. Thus, it is recognized that the DMAC 251 has acquired the right of bus use, and actual data transfer is started using the DMAC 251 as a bus master.

An address bus and a data bus indicated by dotted lines in FIG. 5 denote portions to be used in the case where the right of bus use is exercised using the CPU 252 as a bus master, and obtain high impedance once the right of bus use is released. Therefore, the DMAC 251 can carry out DMA transfer by using an address bus and a data bus indicated by solid lines in FIG. 5.

At this point, the DMAC 251 sets the I/O device 254 in a DMA transfer enable state by a response signal DACK to the DMA transfer request from the I/O device 254, and at the same time, sets a memory 253 in an enable state by a chip enable signal CE. At the same time, the DMAC 251 inputs an address indicated by the address register p to the memory 253 through the address bus.

DMA transfer for one word is carried out as follows. In the case of data transfer from the I/O device 254 to the memory 253, both an I/O device read signal IOR and a memory write signal MEMW are activated. On the other hand, in the case of data transfer from the memory 253 to the I/O device 254, both a memory read signal MEMR and an I/O device write signal IOW are activated. A signal appearing on the data bus at this point becomes data to be transferred.

Every time one word of data is transferred, increment is made on the value of the address register p, and at the same time, decrement is made on value of the word counter c. DMA transfer is continuously carried out until the value of the word counter c becomes 0 or the DMA transfer request DREQ from the I/O device 254 is withdrawn. In any case, at the same time as the end of DMA transfer, the DMAC 251 withdraws the right of bus use request signal BUSREQ outputted to the CPU 252, and the CPU 252 recognizing this withdrawal withdraws the right of bus use release signal BUSACK, thereby resuming interrupted processing.

As described above, DMA transfer is adapted for realizing effective use of a bus band. It enables execution of data transfer in a burst-like manner, which is time-consuming if carried out through the CPU, and also enables the bus master other than the CPU to carry out efficient control of the memory and the I/O device without lowering performance of the CPU.

Meanwhile, in the case where the information recording/reproducing device is constituted by a hard disk drive or a PC card, initially, a file is recorded at physical continuous recording positions of a recording medium. However, as rewrite of the file is repeated, the file will be split and recorded at physically separated positions.

With the DMAC described in the conventional technique, in the case where data constituting a file to be read out are scattered in the memory or conversely in the case where a file must be recorded into free areas scattered in the memory, transmission/reception of the right of bus use and reset of the DMAC must be carried out through the CPU for each data split into an arbitrary length. There is a possibility that such overhead processing increases in proportion to the degree of scattering of data and significantly lowers the efficiency of data transfer.

To improve the efficiency of data transfer, it is conceivable to introduce a parallel control system for a plurality of recording medium pieces as proposed and described in the specification and drawings of the Japanese Publication of Unexamined Patent Application No. Hei 7-200181 by the present Assignee. The technique proposed in the specification and drawings of the Japanese Publication of Unexamined Patent Application No. Hei 7-200181 realizes highly efficient information transfer by simple control, by carrying out parallel writing in a regular order with respect to a plurality of recording medium pieces in an information recording device constituted by a recording medium such as a flash memory in which the write speed is not uniform depending on each recording unit. However, also in the technique proposed in the specification and drawings of the Japanese Publication of Unexamined Patent Application No. Hei 7-200181, with the DMAC of the conventional technique, overhead processing during data transfer as described above is necessary for each data of an arbitrary length constituting the file. Although a delay before the start of transfer is allowed to a certain extent with respect to real-time data such as music or a picture, a delay after the start of transfer lacks temporal correctness and becomes a serious problem causing generation of noise or fluctuation of picture.

Also, as the performance of the DMAC other than the data transfer speed, capability for carrying out data transfer independent of the recording medium and the recording format is required. In short, it is desired to flexibly cope with the case where the structure and type of recording media vary or the case where the recording position and recording order vary.

DISCLOSURE OF THE INVENTION

Thus, in view of the foregoing status of the art, it is an object of the present invention to provide recording medium control device and method which are adapted for carrying out high-speed data transfer by parallel control of recording medium pieces while restraining overhead processing in data transfer and which enable data transfer of high versatility.

A recording medium control device according to the present invention includes a plurality of ordered address registers for holding address values with respect to a recording medium on which information can be recorded, a pointer for sequentially selecting one effective address register from the plurality of address registers, and a control circuit for carrying out control to output the address value of the address register indicated by the pointer and a control signal to the recording medium so as to carry out parallel control with respect to a plurality of addresses in the recording medium.

Also, a recording medium control device according to the present invention includes an address register for holding an address value with respect to a recording medium constituted by a plurality of recording medium pieces on which information can be recorded, a selection circuit for generating a recording medium selection signal corresponding to each of the plurality of recording medium pieces on the basis of the address value, and a control circuit for carrying out control to output the address value, the recording medium selection signal and a control signal to the recording medium piece so as to carry out control with respect to the plurality of recording medium pieces.

In addition, a recording medium control device according to the present invention includes an address register for holding an address value with respect to a recording medium on which information can be recorded, and a control circuit for carrying out control to output the address value of the address register and a control signal to the recording medium and for changing control with respect to the recording medium in accordance with the value of the address register.

A recording medium control method according to the present invention includes the steps of sequentially selecting one effective address register from a plurality of ordered address registers for holding address values with respect to a recording medium on which information can be recorded, and carrying out control to output the address value of the selected address register and a control signal to the recording medium so as to carry out parallel control with respect to a plurality of addresses in the recording medium.

Also, a recording medium control method according to the present invention includes the steps of holding an address value with respect to a recording medium constituted by a plurality of recording medium pieces on which information can be recorded, generating a recording medium selection signal corresponding to each of the plurality of recording medium pieces on the basis of the address value, and carrying out control to output the address value, the recording medium selection signal and a control signal to the recording medium piece so as to carry out control with respect to the plurality of recording medium pieces.

In addition, a recording medium control method according to the present invention includes the steps of holding an address value with respect to a recording medium on which information can be recorded, and carrying out control to output the address value and a control signal to the recording medium while changing control with respect to the recording medium in accordance with the address value.

BRIEF DESCRIPTION OF THE DRAWINGS

FIG. 8 is a view for explaining a sequence of file write and read control in the information recording/reproducing device according to the embodiment of the present invention.

FIG. 9 is a view for explaining a sequence of file erase control in the information recording/reproducing device according to the embodiment of the present invention.

FIG. 10 is a view (memory map) for explaining another file recording method in the information recording/reproducing device according to the embodiment of the present invention.

FIG. 11 is a view for explaining another sequence of file write and read control in the information recording/reproducing device according to the embodiment of the present invention.

FIG. 12 is a view for explaining another sequence of file erase control in the information recording/reproducing device according to the embodiment of the present invention.

BEST MODE FOR CARRYING OUT THE INVENTION

A preferred embodiment of the present invention will now be described with reference to the drawings.

Figure 1:
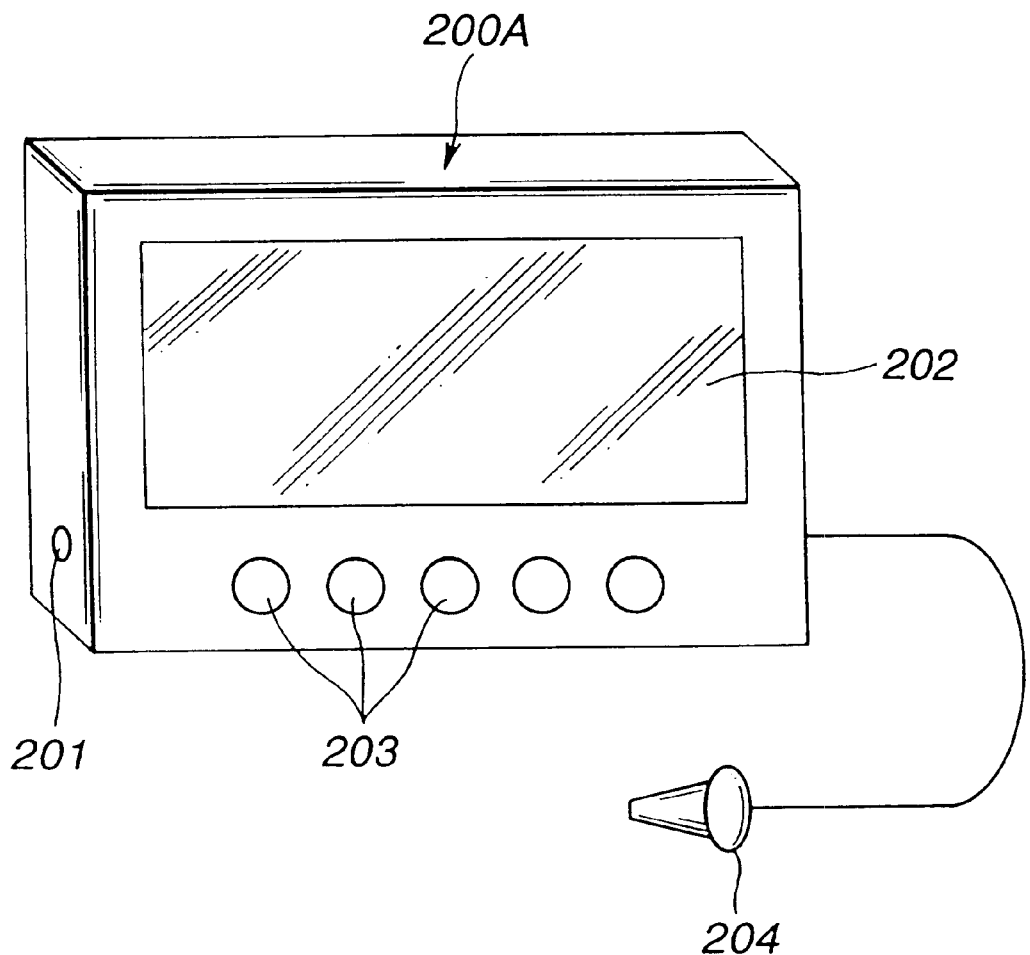
FIG. 1 shows appearance of a conventional information recording/reproducing device.
Figure 2:
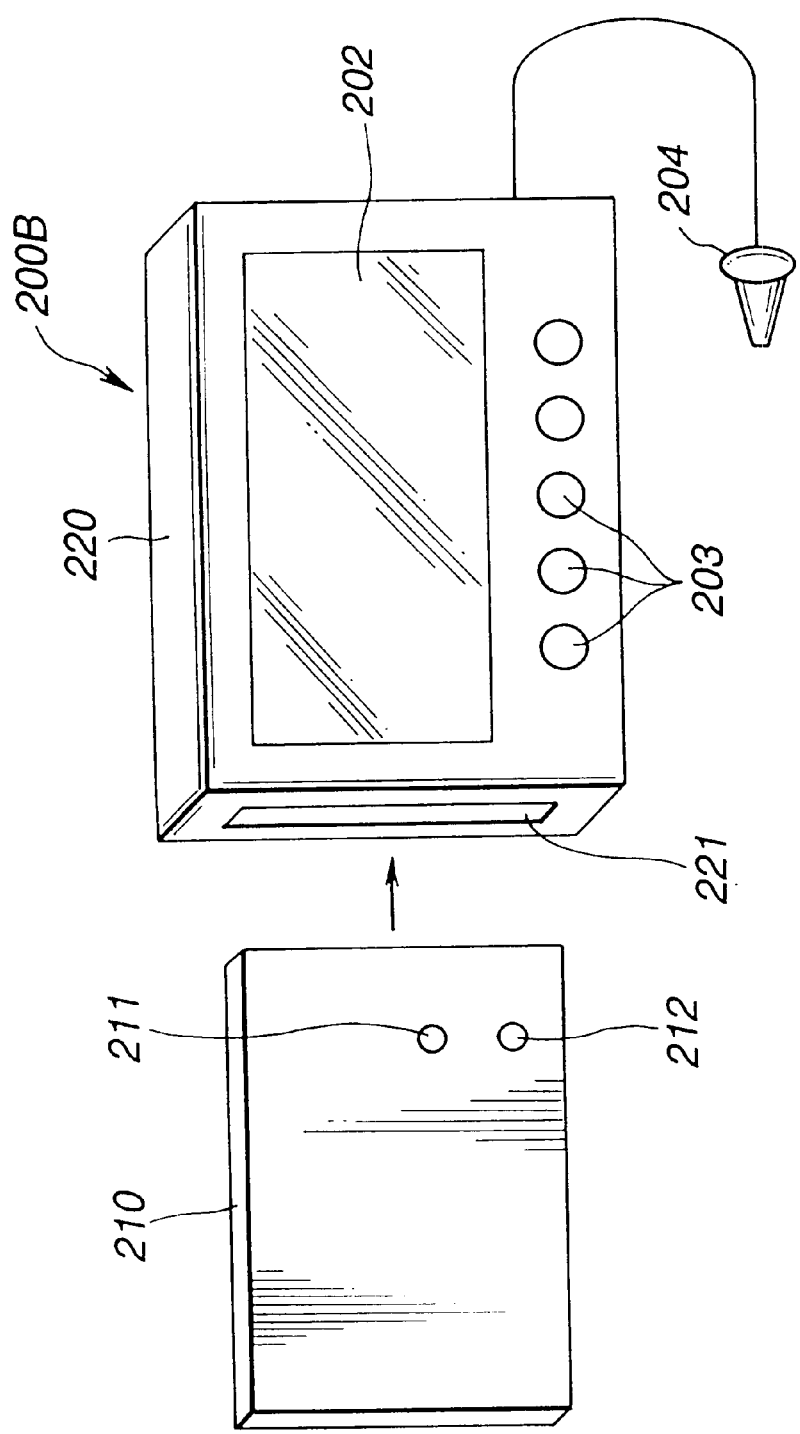
FIG. 2 shows appearance of another conventional information recording/reproducing device.
Figure 3:
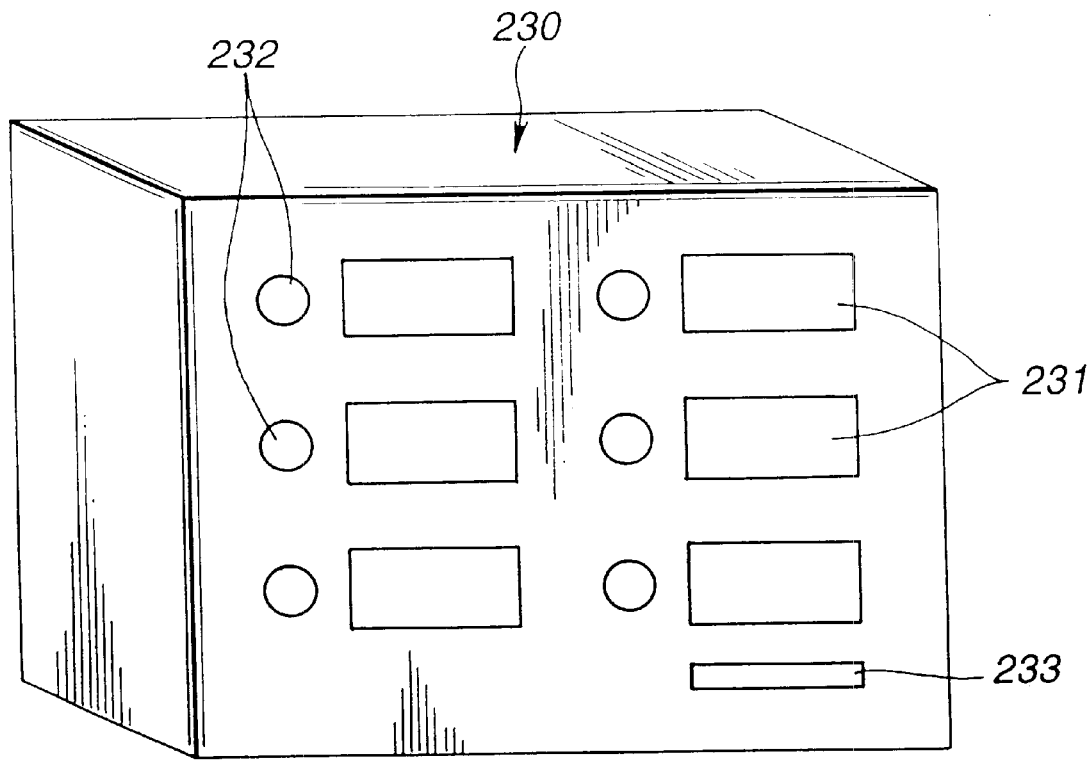
FIG. 3 shows appearance of a conventional information providing device.
Figure 4:
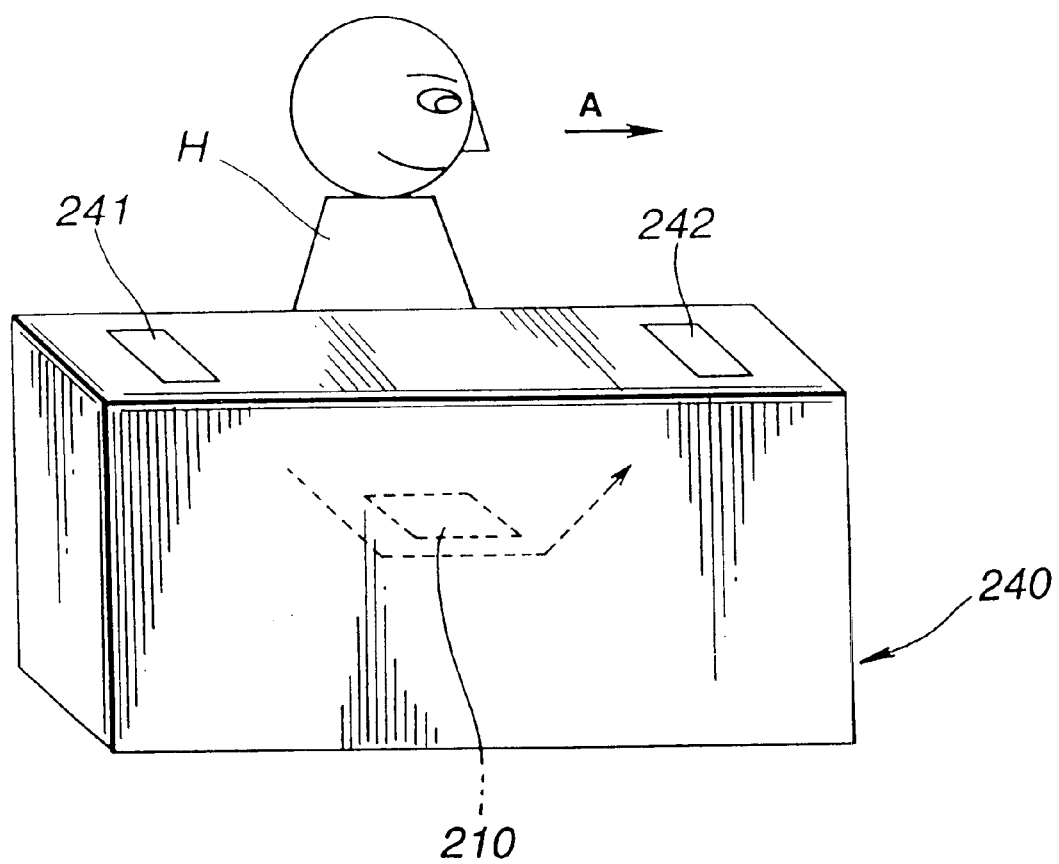
FIG. 4 shows appearance of another conventional information providing device.
Figure 5:
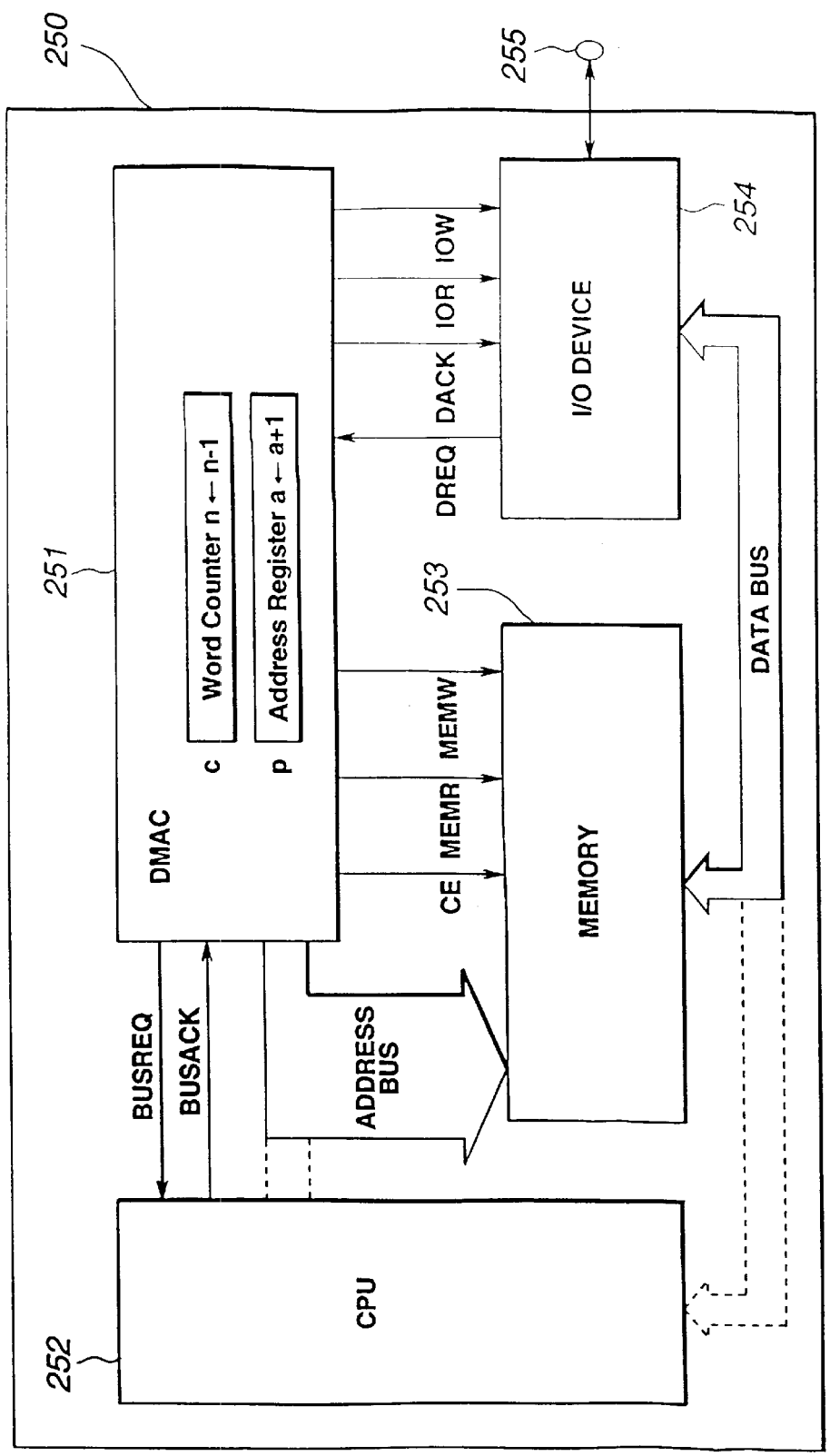
FIG. 5 is a block circuit diagram showing the schematic structure of the conventional information recording/reproducing device.
Figure 6:
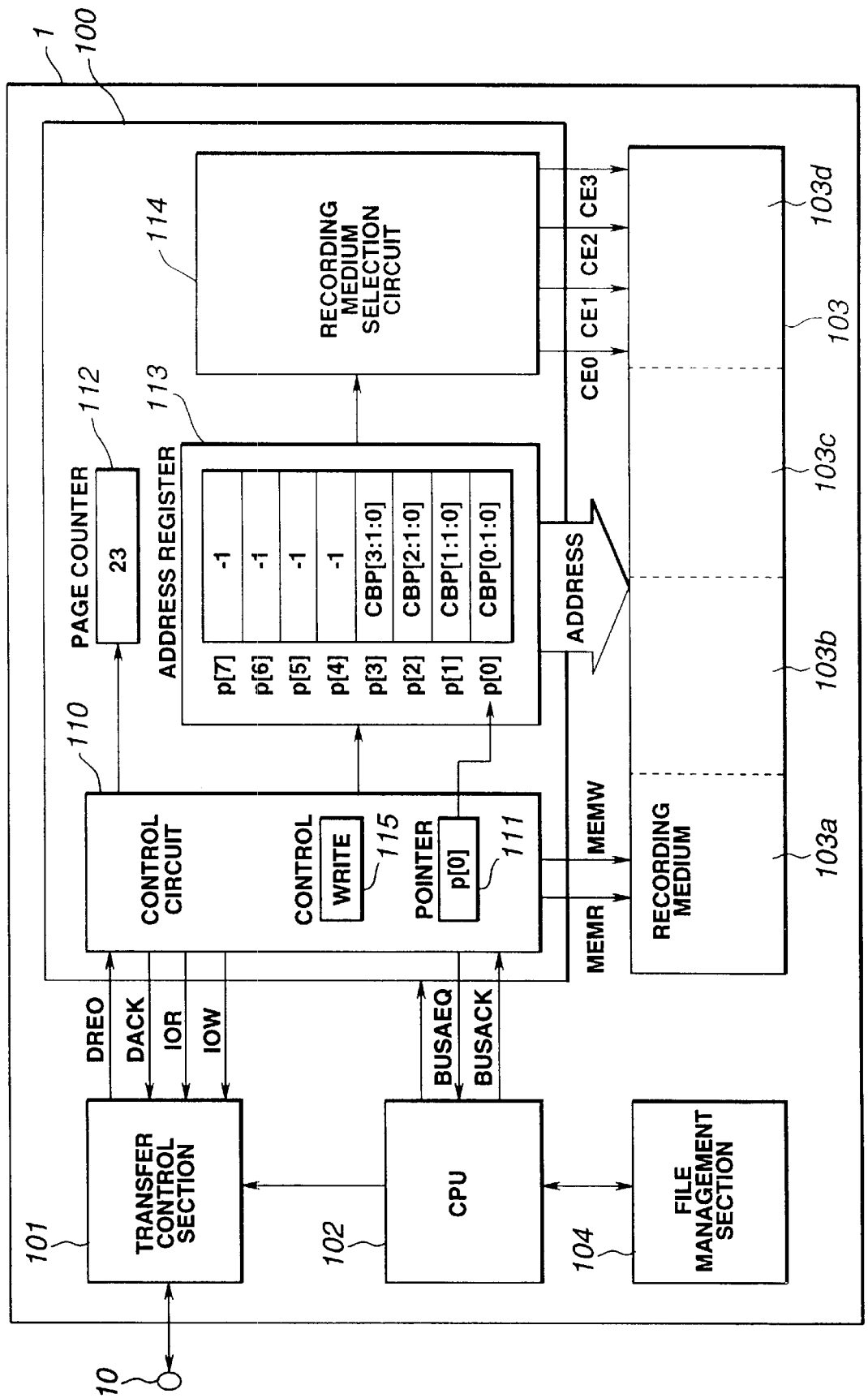
FIG. 6 is a block circuit diagram showing the schematic structure of an information recording/reproducing device according to an embodiment of the present invention.

FIG. 6 is a schematic block diagram showing the overall structure of an information recording/reproducing device. The main structure is substantially similar to that of FIG. 5, and in this case, there is further provided a detailed recording medium control section 100 realizing the present invention.

An information recording/reproducing device 1 according to the embodiment of the present invention includes a transfer control section 101 for carrying out input/output of transfer data through an input/output terminal 10 for connection with the above-described information providing device or information reproducing device, a recording medium control section 100 for writing or reading the transfer data to or from a recording medium 103, a file management section 104 for managing a file recorded on the recording medium 103, and a CPU 102 for controlling setting and execution of the foregoing constituent elements.

On the assumption that a read/write unit of data is referred to as a page, the recording medium control section 100 includes a page counter 112 for counting the number of pages in data transfer, an address register group 113 constituted by eight address registers p[0], p[1], . . . , p[7] for holding address designation values for designating addresses with respect to the recording medium 103, a control circuit 110 which includes a pointer 111 for selecting one effective address register from these plural address registers and a control register 115 for holding a value for designating the type of control with respect to the recording medium 103 and is adapted for transmitting/receiving a control signal to/from the transfer control section 101, the CPU 102 and the recording medium 103, and a recording medium selection circuit 114 for selecting a plurality of recording medium pieces constituting the recording medium 103.

In the example of FIG. 6, the recording medium 103 is constituted by four physically separated recording medium pieces 103a, 103b, 103c, and 103d. It is assumed that the address (Address) and control signals MEMR, MERW provided to the recording medium 103 are inputted to all the recording medium pieces, and that four recording medium selection signals CE0, CE1, CE2, and CE3 outputted from the recording medium selection circuit 114 are inputted to the four recording medium pieces 103a, 103b, 103c and 103d, respectively. In addition, the number of address registers constituting the address register group 113 is arbitrarily determined, and various numbers can be selected in accordance with the structure of the recording medium or the like. Also, the number of recording medium pieces is arbitrarily determined as long as it is not greater than the number of recording medium pieces that can be controlled by the recording medium control section 100, that is, not greater than the number of recording medium selection signals.

A significant feature of the embodiment of the present invention is that the recording medium control section 100 that can be directly connected to the recording medium 103 is realized by providing, within the recording medium control section 100, the recording medium selection circuit 114 for generating the recording medium selection signals CE0 to CE3 corresponding to the address values of the address register group 113, thus making an external circuit such as an address decoder unnecessary. In this embodiment, the recording medium selection signals CE0 to CE3 corresponding to the address values are generated. However, it is a matter of course that the recording medium selection signals can be caused to correspond to the individual address registers, and such method is also included in the present invention.

The processing contents of the control circuit 110 in the recording medium control section 100 includes transmission/reception of a control signal for an interface with the transfer control section 101, the CPU 102 and the recording medium 103, update of each value of the address register group 113 and the value of the counter 112, and update of the value of the pointer 111 with respect to the address registers, in response to the value of the control register 115.

Every time data transfer for one page is carried out, the control circuit 110 makes decrement (reduction by "1") on the page counter 112, and at the same time, makes increment (increase by "1") on the address value of the address register indicated by the pointer 111. The pointer 111 has a pointer value with respect to the leading address register p[0] as an initial value at the start of data transfer, and every time data transfer for one page is carried out, the pointer value is updated to a pointer value corresponding to the next address register.

The next address register in this case means an address register adjacent to the current address register indicated by the pointer 111. The next address register to the address register p[0] is the address register p[1], and the next address register to the address register p[1] is the address register p[2]. However, in the case where the pointer value of the pointer 111 indicates the last address register p[7], the next address register is p[0]. In short, the pointer 111 repeats designation of the address registers in the order of p[0], p[1], p[2], . . . , p[7], p[0], . . . until data transfer ends.

To the address register group 113, a control command that can be recognized by the control circuit 110 can be designated other than the address value with respect to the recording medium 103. For example, a control command (for example, a value of −1) for causing the pointer 111 to designate the leading address register p[0] as the next effective address register. In short, in the example of FIG. 6, since the address value of −1 is held as a control command in the fifth address register p[4], the pointer 111 repeats designation of the address registers in the order of . . . , p[3], p[0], p[1], p[2], . . .

Also, the control circuit 110 can change the processing contents in accordance with the address value held in the current address register. For example, if an overflow address value is held in the current address register or if an address value of a system area is held, the pointer 111 can designate the next address register after the current address register or the leading address register p[0] as the next effective address register, skipping the current address register. The pointer 111 can also interrupt data transfer processing. In the example of FIG. 6, if the value of the third address register p[2] is updated to an overflow address value during data transfer, the pointer 111 can repeat designation of the other effective address registers in the order of p[1], p[3], p[0], . . .

A significant feature of the present invention is that there is realized a circuit for carrying out operation other than control with respect to the recording medium or another control with respect to the recording medium by the value of the address register holding the address value of the recording medium which is normally a target of write and read control. For example, a control circuit for carrying out erase control in the case where, during write control, the address value of the address register becomes a value indicating the leading address of a block as a data erase unit, is included in the present invention.

The recording medium selection circuit 114 decodes the address value held in the address register indicated by the pointer value of the pointer 111, then recognizes the recording medium piece of the plural recording medium pieces to which the address corresponds, and outputs a corresponding recording medium selection signal to the recording medium 103. In short, in the example of FIG. 6, the second address register p[1] holds CBP[1:1:0] as the address value. Since this is the address with respect to the recording medium piece 103b, as will be later described, the recording medium selection circuit 114 outputs the recording medium selection signal CE1 to the recording medium piece 103b.

The case where a file is transferred and inputted to the information recording/reproducing device 1 from an information providing device or the like will now be described.

First, the CPU 102 designates the transfer control section 101 to transfer and input a desired file, and at the same time, carries out initial setting of the recording medium control section 100.

In the initial setting of the recording medium control section 100, first, a free area in the recording medium 103 for writing the transfer file is searched by the file management section 104. Then, a corresponding address value is set to the address register group 113, and the number of pages of the transfer file is set to the page counter 112. Also, write control is designated to the control register 115. At this point, the pointer 111 is set to indicate the leading address register p[0].

On detecting the file to be transferred and inputted from the input/output terminal 10, the transfer control section 101 outputs a signal DREQ to the recording medium control section 100, thereby requesting data write to the recording medium 103. The recording medium control section 100, receiving this signal, needs to use the address bus and the data bus to carry out data transfer, and outputs a signal BUSREQ to the CPU 102, thereby requesting the right of bus use.

The CPU 102, receiving this signal, completes necessary processing such as interruption of execution of a program, and then sends back to the recording medium control section 100 a signal BUSACK indicating release of the bus. On recognizing that it has acquired the right of bus use from the signal BUSACK, the recording medium control section 100 sends back to the transfer control section 101 a signal DACK for acknowledging data transfer, thereby starting writing of the transfer file inputted from the input/output terminal 10 to the transfer control section 101, to the recording medium 103. The file write control will be later described in detail.

On completion of transfer and input of all data, the transfer control section 101 withdraws the signal DREQ, and therefore, the recording medium control section 100 withdraws the signal BUSREQ after completing necessary processing such as verification of write results. Then, the CPU 102, having recovered the right of bus use, records management information related to the written file into the file management section 104, thereby completing transfer and input of the file.

Next, the case where a file is transferred and outputted to another information recording/reproducing device from the information recording/reproducing device 1 will be described. Similar to the case of transfer and input, the CPU 102 designates the transfer control section 101 to transfer and output a desired file, and at the same time, carries out initial setting of the recording medium control section 100.

In the initial setting of the recording medium control section 100, management information of the transfer file to be read is searched by the file management section 104. Then, a corresponding address value is set to the address register group 113, and the number of pages of the transfer file is set to the page counter 112. Also, read control is designated to the control register 115. At this point, the pointer 111 is set to indicate the leading address register p[0].

To transfer and output the file, the transfer control section 101 outputs a signal DREQ to the recording medium control section 100, thereby requesting data transfer. The recording medium control section 100, receiving this signal, needs to use the address bus and the data bus to carry out data transfer, and outputs a signal BUSREQ to the CPU 102, thereby requesting the right of bus use.

The CPU 102, receiving this signal, completes necessary processing such as interruption of execution of a program, and then sends back to the recording medium control section 100 a signal BUSACK indicating release of the bus. On recognizing that it has acquired the right of bus use from the signal BUSACK, the recording medium control section 100 starts reading from the recording medium 103 so as to output the file from the input/output terminal 10 through the transfer control section 101. The file read control will be later described in detail.

On completion of transfer and output of all data, the transfer control section 101 withdraws the signal DREQ, and therefore, the recording medium control section 100 withdraws the signal BUSREQ after completing necessary processing, thus completing transfer and output of the file.

By using a randomly accessible semiconductor memory medium or disk medium as the recording medium 103 of the information recording/reproducing device 1, the effect of high-speed information transfer can be obtained. In addition, by using a non-volatile memory, the power source for holding information becomes unnecessary, and further miniaturization of the device 1 can be realized. For example, a writable non-volatile memory such as a flash memory can be used.

Figure 7:
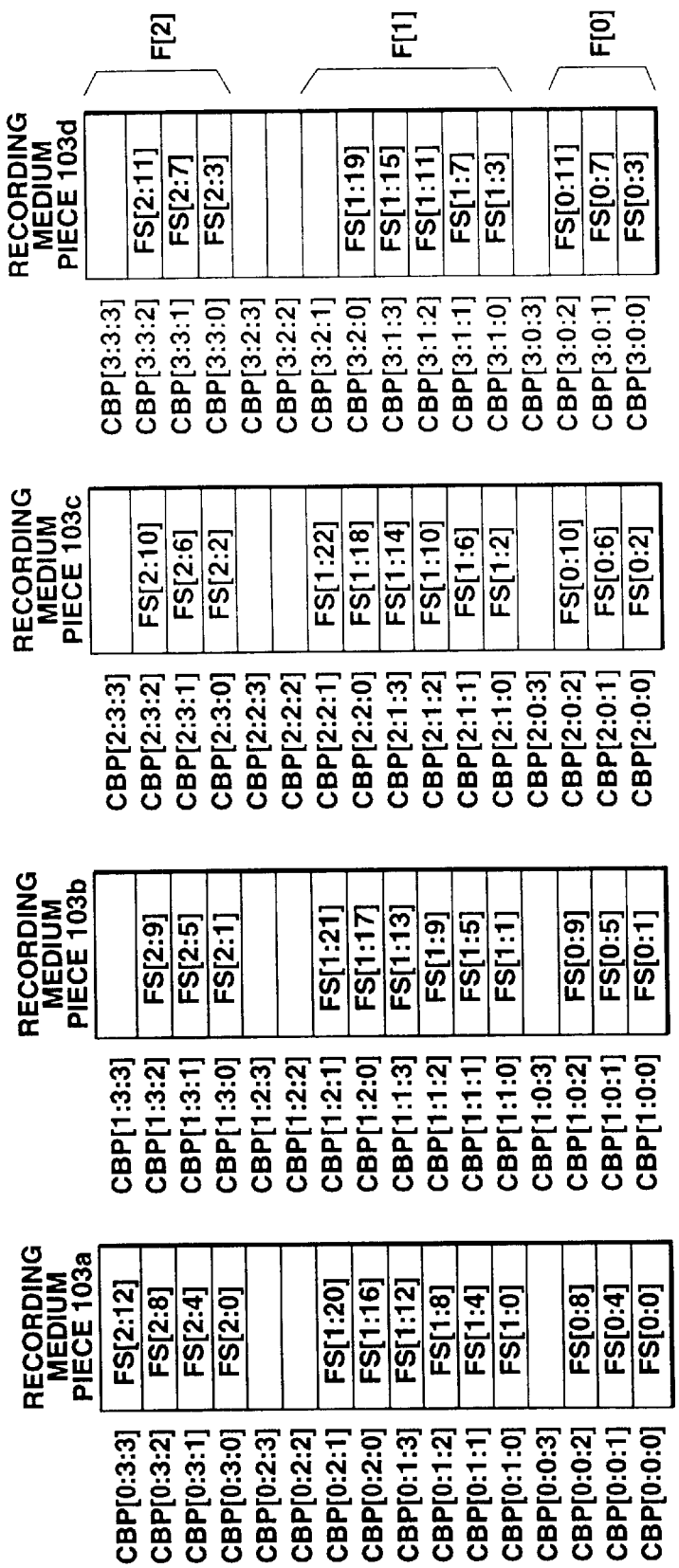
FIG. 7 is a view (memory map) for explaining a file recording method in the information recording/reproducing device according to the embodiment of the present invention.

FIG. 7 shows a specific example of the recording state of the file in the recording medium 103 recorded by the recording medium control section 100, and the file management section 104 in the embodiment of the present invention. In this example, the recording medium 103 is constituted by four recording medium pieces 103a, 103b, 103c, and 103d. As the recording medium piece, each one chip is constituted by four blocks, and each one block is constituted by four pages. The block means the data erase unit, and the page means the data write unit.

As a method for displaying physical addresses in the recording medium 103, three units of C (Chip), B (Block), and P (Page) are used. C corresponds to the memory chip number c, and B corresponds to the block number b as a minimum unit for erase. P corresponds to the page number p as a minimum unit for write. These units are expressed in the form of CBP[c:b:p]. The capacity of one page is set to 512 bytes, which is the same as the capacity of one sector, in order to facilitate application to a FAT (file allocation table) file system or the like. As a method for identifying the data to be recorded, two units of F (File) and S (Sector) are used. F corresponds to the file number f, and S corresponds to the sector number s of a sector constituting the file. These units are expressed in the form of FS[f:s].

In this example, each of recording medium pieces C[0], C[1], C[2], and C[3] is constituted by four blocks B[0] to B[3], and each block is constituted by four pages P[0] to P[3].

The file management section 104 records and manages the name (File) or number, size (Size) and leading address (Loc)

of each file recorded on the recording medium 103 into recording areas M[0] to M[m−1], and manages the logical order of each file. In this case, m is the maximum number of files that can be managed by the file management section 104. The value (−1) described in the file management section 104 in FIG. 7 indicates that it is invalid file management data.

In this example, it is assumed that sector data of each file is recorded over the four recording medium pieces in the order from the recording medium piece 103a as the leading piece to 103b, 103c, and 103d. Such recording method is already proposed by the present Assignee in the specification and drawings of the Japanese Publication of Unexamined Patent Application No. Hei 7-200181, as described above. Specifically, according to the technique described in the specification and drawings of the Japanese Publication of Unexamined Patent Application No. Hei 7-200181, in the information recording device constituted by a recording medium such as a flash memory in which the write speed is not uniform depending on the recording unit, parallel writing is carried out in a regular order with respect to a plurality of recording medium pieces, thereby realizing highly efficient transfer by simple control, and easily coping with an information recording device constituted by various recording media. In addition, by lowering the voltage supplied to the recording medium pieces except for the recording medium piece as a control target, reduction in power consumption is realized. Also, by carrying out control such that the information in the plural recording medium pieces are continuous in a vertically traverse order, management of information in the information recording device is facilitated.

Moreover, in the embodiment of the present invention, it is assumed that the sector data are recorded from the leading address in the block. Such recording method is already proposed in the specification and drawings of the Japanese Publication of Unexamined Patent Application No. Hei 10-69420 by the present Assignee. According to this recording method described in the specification and drawings of the Japanese Publication of Unexamined Patent Application No. Hei 10-69420, in recording data of a file to a recording medium in which the information erase unit is greater than the information write unit, the data of the file is written from the leading position of the erase unit. In the case where the capacity of a file to be recorded is greater than the recordable capacity in the erase unit, the file to be recorded is split and each of the split file parts is written from the leading position of the erase unit. In addition, a plurality of recording medium pieces in which the information erase unit is greater than the information write unit are used and ordered so as to form a recording medium piece group, and the data of the file to be recorded is split for each write unit. The splitting order and the order of the recording medium pieces are caused to correspond to each other, and each split data is sequentially written onto the plural recording medium pieces in a parallel manner.

The contents recorded in the recording area of the file management section 104 in the example of FIG. 7 indicate the following. That is, three files are recorded in the recording medium 103, and the logical order thereof is F[1], F[2], F[0]. The file F[1] has a capacity of 23 sectors from the leading address CBP[0:1:0] of the block B[1]. The file F[2] has a capacity of 13 sectors from the leading address CBP[0:3:0] of the block B[3]. The file F[0] has a capacity of 12 sectors from the leading address CBP[0:0:0] of the block B[0]. The three files are recorded over four recording medium pieces in a regular manner.

The file F[1] shown in FIG. 7 is written onto the recording medium 103 by carrying out initial setting as described with respect to the recording medium control section 100 of FIG. 6 by the CPU 102. This operation will be described hereinafter.

In starting writing to the recording medium 103 using data of 23 sectors transferred and inputted to the information recording/reproducing device 1 as the file F[1], the CPU searches a free area for 23 sectors by the file management section 104. However, because of limitation of the file management section 104, a free area is searched by using an integral multiple of the four blocks.

As a result, continuous two blocks B[1], B[2] from the recording medium piece 103a, continuous two blocks B[1], B[2] from the recording medium piece 103b, continuous two blocks B[1], B[2] from the recording medium piece 103c, and continuous two blocks B[1], B[2] from the recording medium piece 103d that is, a total of eight blocks, can be secured. Therefore, the leading addresses of these continuous blocks are set to the address register group 113.

In short, CBP[0:1:0], CBP[1:1:0], CBP[2:1:0], and CBP[3:1:0] are set to the address registers p[0], p[1], p[2], and p[3], respectively, and a value (−1) as the above-described control command is set to the address registers p[4], p[5], p[6], and p[7]. Then, a value (23) as the file capacity is set to the page counter 112, and p[0] indicating the leading address is set to the pointer 111. Finally, write control (write) is designated to the control register 115, thereby setting the recording medium control section 100 in an active state.

FIG. 8 shows a sequence of writing of the transferred and inputted file F[1] onto the recording medium 103 as shown in FIG. 7, in the example of initial setting as described with respect to the recording medium control section 100 of FIG. 6. The values with a mark * in FIG. 8 indicate initial values of the pointer 111, the page counter 112 and the address register group 113.

Each row in FIG. 8 indicates the value of the page counter 112 for each data transfer of one page, and the address value held by the address register indicated by the pointer 111 at that time. The leftmost column in FIG. 8 indicates the sector data. In this example, four address registers from among the eight address registers in the recording medium control section 100 are caused to correspond to the four recording medium pieces, thereby carrying out parallel control.

The first data FS[1:0] is recorded at the address CBP[0:1:0] held by the address register p[0] indicated by the initial pointer. Then, the address value of the address register p[0] is updated to CBP[0:1:1] and the counter value is updated to 22. The next data FS[1:1] is recorded at the address CBP[1:1:0] held by the address register p[1] indicated by the updated pointer. Then, the address value of the address register p[1] is updated to CBP[1:1:1] and the counter value is updated to 21. Similarly, the data FS[1:2] is recorded at the address CBP[2:1:0] indicated by the address register p[2], and the data FS[1:3] is recorded at the address CBP[3:1:0] indicated by the address register p[3].

Then, since the address register p[4] indicated by the updated pointer holds the control command (−1), the pointer is re-updated by the control circuit 110 and indicates the address register p[0]. Thus, the next data FS[1:4] is recorded at the address CBP[0:1:1] held by the address register p[0] indicated by the pointer.

Similar processing is repeated, and the last data FS[1:22] is recorded at the address CBP[2:2:1] held by the address register p[2] indicated by the pointer. At this point, the address value is updated to CBP[2:2:2] and the counter value is updated to 0. Therefore, the control circuit 110 recognizes that the write operation is completed, and then ends the processing.

When the write operation in the recording medium control section 100 is completed, the CPU 102 records management information related to the file F[1] into the file management section 104, as described above. In this example, the contents of the transferred and inputted file are already known before the start of transfer. However, as a matter of course, it is possible to record into the file management section 104 the file capacity found by initializing the page counter to 0 and making increment (+1) to count the number of pages transferred and inputted by the time when the transfer control section 101 withdraws the signal DREQ.

Also, parallel read operation of the file can be carried out by using a sequence similar to that of FIG. 8. In short, since the CPU 102 can recognize from the file management section 104 that the file F[1] is recorded with the capacity of 23 pages from the block B[1] as the start position, the sector data FS[1:0] to FS[1:22] constituting the file F[1] are read out in the sequence shown in FIG. 8 by carrying out initial setting similar to that of the recording medium control section 100 of FIG. 6, except for designation of read control to the control register 115.

FIG. 9 shows a sequence in the recording medium control section 100 in the case where the file F[1] of FIG. 7 is to be erased. In this FIG. 9, similar to FIG. 8, each row indicates the value of the page counter 112, and the address value held by the address register indicated by the pointer 111 at that time. However, the leftmost column in FIG. 9 indicates the block address.

Similar to the above-described read operation, the CPU 102 can obtain information related to the start address and capacity of the file from the file management section 104. Therefore, the CPU 102 sets an initial value similar to that in write control or read control, to the address register. However, unlike the above-described operation, the number of blocks to be erased is set as an initial value to the page counter 112. The number of blocks to be erased can be calculated to be eight, since it is a multiple of four (one block=four pages) because of the characteristics of the file management section 104 and since the capacity of the file F[1] is 23 pages.

After erasing one block (continuous four pages) from the address CBP[0:1:0] held by the address register p[0] indicated by the initial pointer, the recording medium control section 100 updates the address value of address register p[0] to CBP[0:2:0] and the counter value to 7. This is indicated in the first row of FIG. 9. Subsequently, after erasing one block from the address CBP[1:1:0] held by the address register p[1] indicated by the updated pointer, the recording medium control section 100 updates the address value of address register p[1] to CBP[1:2:0] and the counter value to 6. This is indicated in the second row of FIG. 9. Similarly, the block at the address CBP[2:1:0] indicated by the address register p[2] is erased, and the block at the address CBP[3:1:0] indicated by the address register p[3] is erased.

Then, since the address register p[4] indicated by the updated pointer holds the control command (−1), the pointer is re-updated by the control circuit 110 and indicates the address register p[0]. Thus, the block at the address CBP[0:2:0] held by the address register p[0] indicated by the pointer is erased.

Similar processing is carried out, and finally, the block at CBP[3:2:0] held by the address register p[3] indicated by the pointer is erased. At this point, the address value is updated to CBP[3:3:0] and the counter value is updated to 0. Therefore, the control circuit 110 recognizes that the erase operation is completed, and then ends the processing. When the erase operation in the recording medium control section 100 is completed, the CPU 102 updates the management information related to the file F[1] into the file management section 104, as described above. In this example, unlike the write operation or read operation, the address value is updated not on the page basis but on the block basis in the control by the control circuit 110.

A significant feature of the present invention is that erase control in addition to the conventional write control and read control is enabled as the control with respect to the recording medium, thus realizing a circuit for carrying out the erase operation with respect to a plurality recording medium pieces in a parallel manner.

FIG. 10 shows another example of the recording state of the file in the recording medium 103. The file F[1] in this example is written by carrying out initial setting of the recording medium control section 100 as shown in FIG. 11. In short, addresses CBP[2:1:0], CBP[3:1:0], CBP[0:2:0], CBP[1:2:0], CBP[2:2:0], and CBP[3:2:0] are designated to the address registers p[0] to p[5], respectively, and the control command (−1) is set to the address registers p[6] and p[7]. Then, a value (23) as the file capacity is set to the page counter 112, and p[0] indicating the leading address register is set to the pointer 111. Finally, write control is designated to the control register 115, thereby setting the recording medium control section 100 in an active state. Thus, since parallel control of six blocks is carried out in a sequence shown in FIG. 11, the file is recorded in the state shown in FIG. 10.

Similarly, the file F[0] is written by setting a counter value of 12 to the page counter 112, then setting addresses CBP[1:0:0], CBP[2:0:0], and CBP[3:0:0] to the address registers p[0], p[1], and p[2], respectively, and setting the control command (−1) to the other address registers.

As a management method for the file recorded as shown in FIG. 10, a method described in an information recording method which is already proposed by the present Assignee in the specification and drawings of the Japanese Publication of Unexamined Patent Application No. Hei 9-40905 can be employed. This method described in the specification and drawings of the Japanese Publication of Unexamined Patent Application No. Hei 9-40905 includes a file management step of managing storage areas of a recording medium constituted by a plurality of information-writable recording medium pieces as a block array constituted by unified continuation of block units vertically traversing the plural recording medium pieces in a regular and ring-shaped manner, and a recording medium control step of controlling the recording medium on the basis of file management information of the file management step. At the recording medium control step, a file is constituted as a file block array made of a block array with an arbitrary length, and is written onto the recording medium at an arbitrary leading address. At the same time, file management information corresponding to writing of the file is generated and stored at the file management step. In short, the recording medium control section 100 carries out control corresponding to any of various file management systems that can be employed in the information recording/reproducing device 1, instead of carrying out control dependent on a specified file management system.

The most significant feature of the present invention is that a circuit for carrying out parallel write or read operation with respect to a plurality of addresses scattered in the recording medium is realized, and that since the scattered addresses need not have particular regularity and hence an arbitrary address of an arbitrary recording medium piece can be designated within a range allowed by the file management system, control of the recording medium corresponding to various file management systems can be carried out.

FIG. 12 shows a sequence in the recording medium control section 100 in the case where the file F[1] of FIG. 10 is to be erased.

The CPU 102 finds the address where the file F[1] is recorded and the number of blocks constituting the file F[1], from the file management section 104, and then sets the resultant values as initial values to the address register and the page counter, respectively.

After erasing one block from the address CBP[2:1:0] held by the address register p[0] indicated by the initial pointer, the recording medium control section 100 updates the address value of the address register p[0] to CBP[2:2:0] and the counter value to 5. This is indicated in the first row of FIG. 12. Subsequently, after erasing one block from the address CBP[3:1:0] held by the address register p[1] indicated by the updated pointer, the recording medium control section 100 updates the address value of address register p[1] to CBP[3:2:0] and the counter value to 4. This is indicated in the second row. Similarly, the block at the address CBP[0:2:0] indicated by the address register p[2] is erased, and the block at the address CBP[1:2:0] indicated by the address register p[3] is erased. Then, the block at the address CBP[2:2:0] indicated by the address register p[4] is erased.

Finally, the block at CBP[3:2:0] held by the address register p[5] indicated by the pointer is erased. At this point, the address value is updated to CBP[3:3:0] and the counter value is updated to 0. Therefore, the control circuit 110 recognizes that the erase operation is completed, and then ends the processing. When the erase operation in the recording medium control section 100 is completed, the CPU 102 updates the management information related to the file F[1] into the file management section 104, as described above.

INDUSTRIAL APPLICABILITY

As is clear from the above description, according to the present invention, in the information recording/reproducing device using a plurality of recording medium pieces such as a flash memory, high-speed read and write control of the file can be carried out while flexibly coping with various file management systems.

What is claimed is:

1. A recording medium control device comprising:
   a plurality of ordered address registers, each address register operable for holding one of a plurality of addresses corresponding to a recording medium on which information can be recorded;
   a pointer for sequentially selecting each effective address register from the plurality of ordered address registers, each effective address register holding a respective one of the plurality of addresses corresponding to the recording medium; and
   a control circuit operably configured to output to the recording medium the respective one address held by the effective address register selected by the pointer and a control signal so as to carry out parallel control with respect to the plurality of addresses corresponding to the recording medium.

2. The recording medium control device as claimed in claim 1, further comprising a control register having a value designating control with respect to the recording medium, the control circuit carrying out one of write control, read control, and erase control with respect to the recording medium on the basis of the value of the control register.

3. The recording medium control device as claimed in claim 2, further comprising a file segment counter operably configured to count when the control circuit outputs the respective one address held by the effective address register selected by the pointer,
   the control circuit carrying out control with respect to the recording medium until the file segment counter counts to a predetermined value.

4. The recording medium device as claimed in claim 3, further comprising file management means for managing a file recorded on the recording medium, the file management means having a starting address for the file,
   the control circuit setting each effective address register based on the starting address,
   the control circuit updating the effective address register selected by the pointer to reflect a next address of the plurality of addresses corresponding to the recording medium in response to the control circuit outputting the respective one address held by the effective address register.

5. The recording medium control device as claimed in claim 4, wherein the file segment counter counts each of a plurality of file segments written to the recording medium when write control is designated to the control register, the control circuit providing a count result from the file segment counter to the file management means for storage in association with the starting address in response to an interruption in file segment counter counting.

6. The recording medium control device as claimed in claim 5, further comprising:
   an input/output terminal for data; and
   a transfer control circuit operably connected to the input/output terminal and to the control circuit, the transfer control circuit controlling input/output of a file between the input/output terminal and the control circuit such that the file is recorded onto or reproduced from the recording medium by the control circuit, the transfer control circuit operably configured to cause the interruption in file segment counter counting.

7. The recording medium control device as claimed in claim 3, wherein the file segment counter counts a file segment having a size corresponding to a write unit when write control is designated to the control register, a read unit when read control is designated to the control register, and erase unit when erase control is designated to the control register.

8. The recording medium control device as claimed in claim 1, wherein the recording medium includes a plurality of recording medium pieces.

9. The recording medium control device as claimed in claim 8, wherein each recording medium piece is responsive to a respective subset of the plurality of addresses corresponding to the recording medium such that one of the recording medium pieces is responsive to the one address held by the one effective address register.

10. The recording medium control device as claimed in claim 9, wherein the control circuit causes a file to be recorded on at least two of the recording medium pieces when at least two of the plurality of ordered address registers holds a respective one of the plurality of addresses corresponding to the recording medium.

11. The recording medium control device as claimed in claim 9, further comprising a means for setting two or more of the plurality of ordered address registers so that the pointer sequentially selects at least two effective address registers from among the ordered address registers when a file to be transferred with respect to the recording medium has a file size that exceeds an erase unit associated with a first of the recording medium pieces, the setting means setting a first of the at least two address registers to hold an address corresponding to the first of the recording medium pieces and a second of the at least two address registers to hold an address corresponding to a second of the recording medium pieces.

12. The recording medium control device as claimed in claim 4, further comprising a means for updating each effective register among the plurality of ordered address registers when the file size of the file to be transferred exceeds the erase unit associated with the first of the recording medium pieces in combination with another erase unit associated with the second of the recording medium pieces, the updating means updating the first of the at least two address registers to hold another address corresponding to the first of the recording medium pieces when the pointer sequentially selects a next of the ordered address registers following the first register, the updating means updating the second of the at least two address registers to hold another address corresponding to the second of the recording medium pieces when the pointer sequentially selects a next of the ordered registers following the second register.

13. The recording medium control device as claimed in claim 1, further comprising a file segment counter operably configured to count when the control circuit outputs the respective one address held by the effective address register selected by the pointer, the control circuit carrying out control with respect to the recording medium until the file segment counter counts to a predetermined value.

14. The recording medium control device as claimed in claim 1, further comprising file management means for managing a file recorded on the recording medium, the file management means having a predetermined value associated with the file, the control circuit setting each effective address register from the plurality of ordered address registers on the basis of the predetermined value of the file management means, the control circuit changing the predetermined value of the file management means in accordance with a change of the file.

15. The recording medium control device as claimed in claim 1, further comprising:

an input/output terminal for data; and a transfer control circuit operably connected to the input/output terminal and to the control circuit, the transfer control circuit controlling input/output of a file between the input/output terminal and the control circuit such that the file is recorded onto or reproduced from the recording medium by the control circuit.

16. The recording medium control device as claimed in claim 1, wherein the recording medium is a semiconductor memory.

17. The recording medium control device as claimed in claim 16, wherein the semiconductor memory is a non-volatile memory.

18. The recording medium control device as claimed in claim 17, wherein the non-volatile memory is an electrically erasable read-only memory.

19. The recording medium control device as claimed in claim 1, wherein the pointer includes means for determining whether a next one of the plurality of ordered address registers is set to a predetermined command and restarting sequentially selecting one effective address register at a first one of the plurality of address registers in response to determining that the next one is set to the predetermined command.

20. The recording medium control device as claimed in claim 1, wherein the pointer includes means for determining whether a next one of the plurality of ordered address registers holds an overflow address value and skipping the next one when sequentially selecting one effective address register in response to determining that the next one holds an overflow address value.

21. A recording medium control device for use in association with a recording medium, the recording medium having a plurality of medium pieces on which information can be recorded, each of the plurality of recording medium pieces having a corresponding plurality of addresses, the recording medium control device comprising:

an address register for holding one of the plurality of addresses corresponding to one of the plurality of recording medium pieces on which information can be recorded;

a selection circuit operably configured to generate one of a plurality of recording medium selection signals for output to the one of the plurality of recording medium pieces based on the one address held by the address register, and a control circuit operably configured to output the one address held by the address register, the one recording medium selection signal, and a control signal to the one recording medium piece so as to carry out control with respect to the plurality of recording medium pieces, wherein control is carried out by the control circuit in accordance with the one address.

22. The recording medium control device as claimed in claim 21, further comprising a control register having a value designating control with respect to the recording medium, the control circuit carrying out one of write control, read control, and erase control with respect to the recording medium on the basis of the value of the control register.

23. The recording medium control device as claimed in claim 22, further comprising a file segment counter operably configured to count when the control circuit outputs the one address held by the address register, the control circuit carrying out control with respect to the recording medium until the file segment counter counts to a predetermined value.

24. The recording medium control device as claimed in claim 23, further comprising file management means for managing a file recorded on the recording medium, the file management means having a predetermined value associated with the file, the control circuit setting the value of the address register on the basis of the predetermined value of the file management means, the control circuit changing the predetermined value of the file management means in accordance with a change of the file.

25. The recording medium control device as claimed in claim 24, wherein the file segment counter counts each file segment written to the recording medium when write control is designated to the control register, the control circuit providing a count result from the file segment counter to the file management means so that the predetermined value associated with the file is changed.

26. The recording medium control device as claimed in claim 23, wherein the file segment counter counts a file segment having a size corresponding to a write unit when write control is designated to the control register, to a read unit when read control is designated to the control register, and to an erase unit when erase control is designated to the control register.

27. The recording medium control device as claimed in claim 21, wherein the address register is one of a plurality of address registers and another of the plurality of address registers is operably configured to hold a different one of the plurality addresses corresponding to another of the recording medium pieces, the selection circuit generating another of the plurality of recording medium selection signals for output to the other of the plurality of recording medium pieces based on the different one address corresponding to the other of the recording medium pieces held by the other address register.

28. The recording medium control device as claimed in claim 27, further comprising a file segment counter operably configured to count when the control circuit outputs the one address held by the address register and when the control circuit outputs the different one address held by the other address register, the control circuit carrying out control with respect to the recording medium until the file segment counter counts to a predetermined value.

29. The recording medium control device as claimed in claim 28, further comprising file management means for managing a file recorded on the recording medium, the file management means having a starting address for the file, the starting address reflecting the one of the plurality of addresses corresponding to the one recording medium piece, the control circuit setting the address register and the other address register based on the starting address, the control circuit updating the address register to reflect a next address of the plurality of addresses corresponding to the one recording medium piece while the control circuit outputs the different one address held by the other address register.

30. The recording medium control device as claimed in claim 29, further comprising:

an input/output terminal for data; and a transfer control circuit operably connected to the input/output terminal and to the control circuit, the transfer control circuit controlling input/output of the file between the input/output terminal and the control circuit such that the file is recorded onto or reproduced from the recording medium by the control circuit.

31. The recording medium control device as claimed in claim 21, wherein the recording medium is a semiconductor memory.

32. The recording medium control device as claimed in claim 31, wherein the semiconductor memory is a non-volatile memory.

33. The recording medium control device as claimed in claim 32, wherein the non-volatile memory is an electrically erasable read-only memory.

34. A recording medium control device comprising:

an address register for holding one of the plurality of addresses corresponding to a recording medium on which information can be recorded; and a control circuit operably configured to output the one address held by the address register and a control signal to the recording medium and operably configured to change control with respect to the recording medium in accordance with the one address held by the address register.

35. The recording medium control device as claimed in claim 34, wherein the control circuit is operably configured to change control with respect to the recording medium in accordance with the address register holding a different one of the plurality of addresses corresponding to the recording medium.

36. The recording medium control device as claimed in claim 34, further comprising a control register having a value designating control with respect to the recording, the control circuit carrying out one of write control, read control, and erase control with respect to the recording medium on the basis of the value of the control register.

37. The recording medium control device as claimed in claim 36, wherein the control circuit carries out erase control with respect to the recording medium before write control in accordance with the one address held by the address register when write control is designated to the control register.

38. The recording medium control device as claimed in claim 36, further comprising a file segment counter operably configured to count when the control circuit outputs the address held by the address register, the control circuit carrying out control with respect to the recording medium until the file segment counter counts to a predetermined value.

39. The recording medium control device as claimed in claim 38, further comprising file management means for managing a file recorded on the recording medium, the file management means having a starting address for the file, the control circuit setting the address register based on the starting address, the control circuit updating the address register to reflect a next address of the plurality of addresses corresponding to the recording medium in response to the control circuit outputting the one address held by the address register.

40. The recording medium control device as claimed in claim 39, wherein the file segment counter counts each file segment written to the recording medium when write control is designated to the control register, the control circuit providing a count result from the file segment counter to the file management means for storage in association with the starting address in response to an interruption in file segment counter counting.

41. The recording medium control device as claimed in claim 38, wherein the file segment counter counts a file segment having a size corresponding to a write unit when write control is designated to the control register, to a read unit when read control is designated to the control register, and to an erase unit when erase control is designated to the control register.

42. The recording medium control device as claimed in claim 34, further comprising a file segment counter operably configured to count when the control circuit outputs the one address held by the address register, the control circuit carrying out control with respect to the recording medium until the file segment counter counts to a predetermined value.

43. The recording medium control device as claimed in claim 34, further comprising file management means for managing a file recorded on the recording medium, the file management means having a predetermined value associated with the file, the control circuit setting the value of the address register on the basis of the predetermined value of the file management means, the control circuit changing the predetermined value of the file management means in accordance with a change of the file.

44. The recording medium control device as claimed in claim 43, further comprising:

an input/output terminal for data; and a transfer control circuit operably connected to the input/output terminal and to the control circuit, the transfer control circuit controlling input/output of the file between the input/output terminal and the control circuit such that the file is recorded onto or reproduced from the recording medium by the control circuit.

45. The recording medium control device as claimed in claim 34, wherein the recording medium is a semiconductor memory.

46. The recording medium control device as claimed in claim 45, wherein the semiconductor memory is a non volatile memory.

47. The recording medium control device as claimed in claim 46, wherein the non-volatile memory is an electrically erasable read-only memory.

48. A recording medium control method comprising the steps of:

sequentially selecting an effective address register from a plurality of ordered address registers that holds one of a plurality of addresses corresponding to a recording medium on which information can be recorded; and outputting to the recorded medium the one address held by the selected effective address register and a control signal so as to carry out parallel control with respect to the plurality of addresses corresponding to the recording medium.

49. The recording medium control method as claimed in claim 48, further comprising the steps of:

designating a control method with respect to the recording medium, and carrying out one of write control, read control, and erase control with respect to the recording medium based on the designated control method.

50. The recording medium control method as claimed in claim 49, wherein the step of carrying out further comprises the steps of:

updating a file segment counter when the control circuit outputs the one address held by the selected address register; and carrying out one of write control, read control, and erase control with respect to the recording medium based on the designated control method until the file segment counter is updated to a predetermined value.

51. The recording medium control method as claimed in claim 50, further comprising the steps of:

receiving a starting address for a file from a file management means operable for managing the file, the starting address reflecting a different one of the plurality of addresses;

setting the plurality of address registers based on the starting address; and updating the selected address register to reflect a next address of the plurality of addresses corresponding to the recording medium after the control circuit outputs the one address held by the selected address register.

52. The recording medium control method as claimed in claim 51, further comprising the steps of:

splitting the file into a plurality of segments, the file segment counter reflecting the quantity of segments of the file written to the recording medium when write control is designated to the control register; and providing the quantity reflected by the file segment counter to the file management means for storage in association with the starting address in response to an interruption in updating the file segment counter.

53. The recording medium control method as claimed in claim 50, wherein the file segment counter is updated to reflect the transfer of one of a plurality of segments of a file, each segment having a size based on the a write unit when write control is designated to the control register, a read unit when read control is designated to the control register, and erase unit when erase control is designated to the control register.

54. The recording medium control method as claimed in claim 48, wherein the step of carrying out further comprises the steps of:

updating a file segment counter when the control circuit outputs the address held by the selected address register; and carrying out one of write control, read control, and erase control with respect to the recording medium based on the designated control method until the file segment counter is updated to a predetermined value.

55. The recording medium control method as claimed in claim 48, further comprising the steps of:

receiving a predetermined value associated with a file, the predetermined value stored by a file management means in association with managing the file;

setting the plurality of address registers based on the predetermined value; and changing the predetermined value stored by the file management means in accordance with a change of the file.

56. A recording medium control method comprising the steps of:

setting an address register to hold an address from among a plurality of addresses corresponding to a recording medium, the recording medium having a plurality of recording medium pieces on which information can be recorded;

generating one of a plurality of recording medium selection signals and a control signal on the basis of the address held by the address register, each of the plurality of recording medium selection signals corresponding to a respective one of the plurality of recording medium pieces; and outputting the address, the one recording medium selection signal and the control signal to the respective one recording medium piece corresponding to the one recording medium selection signal so as to carry out control with respect to the plurality of recording medium pieces, wherein control is carried out in accordance with the one address.

57. The recording medium control method as claimed in claim 56, further comprising the steps of:

designating a control method with respect to the recording medium, and carrying out one of write control, read control, and erase control with respect to the recording medium based on the designated control method.

58. The recording medium control method as claimed in claim 57, wherein the step of carrying out further comprises the steps of:

updating a file segment counter when the control circuit outputs the address held by the address register; and carrying out one of write control, read control, and erase control with respect to the recording medium based on the designated control method until the file segment counter is updated to a predetermined value.

59. The recording medium control method as claimed in claim 58, further comprising the steps of:
receiving a starting address for a file from a file management means operable for managing the file;
determining the address to set in the address register based on the starting address, the count reflected by the file segment counter, and the designated control method; and
updating the address register to reflect a next address of the plurality of addresses corresponding to the recording medium after the control circuit outputs the address held by the address register.

60. The recording medium control method as claimed in claim 59, wherein the file segment counter reflects the quantity of segments of the file written to the recording medium when write control is designated to the control register; and the recording medium control method further comprises the step of providing the quantity reflected by the file segment counter to the file management means in response to an interruption in updating the file segment counter.

61. The recording medium control method as claimed in claim 58, wherein the file segment counter is updated to reflect the transfer of one of a plurality of segments of a file, each segment having a size based on the a write unit when write control is designated to the control register, a read unit when read control is designated to the control register, and erase unit when erase control is designated to the control register.

62. The recording medium control method as claimed in claim 56, wherein the step of carrying out further comprises the steps of:
updating a file segment counter when the control circuit outputs the address held by the selected effective address register; and
carrying out one of write control, read control, and erase control with respect to the recording medium based on the designated control method until the file segment counter is updated to a predetermined value.

63. The recording medium control method as claimed in claim 56, further comprising the steps of:
receiving a predetermined value associated with a file, the predetermined value stored by a file management means in association with managing the file;
setting the address register based on the predetermined value; and
changing the predetermined value stored by the file management means in accordance with a change of the file.

64. A recording medium control method comprising the steps of
setting an address register to hold an address from among a plurality of addresses corresponding to a recording medium on which information can be recorded; and
outputting the address held by the address register and a control signal to the recording medium so as to carry out control with respect to recording medium; and
changing control with respect to the recording medium in accordance with the address held by the address register.

65. The recording medium control method as claimed in claim 64, wherein the step of changing control further comprises setting the address register to hold another of the addresses corresponding to the recording medium.

66. The recording medium control method as claimed in claim 64, further comprising the steps of:
designating a control method with respect to the recording medium; and
carrying out one of write control, read control, and erase control with respect to the recording medium based on the designated control method.

67. The recording medium control method as claimed in claim 66, wherein erase control with respect to the recording medium is carried out before write control in accordance with the address held by the address register when the write control is designated.

68. The recording medium control method as claimed in claim 66, wherein the step of carrying out further comprises the steps of:
updating a file segment counter in association with outputting the address held by the address register; and
carrying out one of write control, read control, and erase control with respect to the recording medium based on the designated control method until the file segment counter is updated to a predetermined value.

69. The recording medium control method as claimed in claim 68, further comprising the steps of:
receiving a starting address for a file from a file management means operable for managing the file;
determining the address to set in the address register based on the starting address, the count reflected by the file segment counter, and the designated control method, and
updating the address register to reflect a next address of the plurality of addresses corresponding to the recording medium after the control circuit outputs the address held by the address register.

70. The recording medium control method as claimed in claim 69, wherein the file segment counter reflects the quantity of segments of the file written to the recording medium when write control is designated to the control register; and the recording medium control method further comprises the step of providing the quantity reflected by the file segment counter to the file management means in response to an interruption in updating the file segment counter.

71. The recording medium control method as claimed in claim 68, wherein the file segment counter is updated to reflect the transfer of one of a plurality of segments of a file, each segment having a size based on the a write unit when write control is designated to the control register, a read unit when read control is designated to the control register, and erase unit when erase control is designated to the control register.

72. The recording medium control method as claimed in claim 64, wherein the step of carrying out further comprises the steps of
updating a file segment counter when the control circuit outputs the address held by the address register; and
carrying out one of write control, read control, and erase control with respect to the recording medium based on the designated control method until the file segment counter is updated to a predetermined value.

73. The recording medium control method as claimed in claim 64, further comprising the steps of:
receiving a predetermined value associated with a file, the predetermined value stored by a file management means in association with managing the file;
setting the address register based on the predetermined value; and
changing the predetermined value stored by the file management means in accordance with a change of the file.

74. A recording medium control device for use in association with a recording medium, the recording medium having a plurality of medium pieces on which information can be recorded, each of the plurality of recording medium pieces having a corresponding plurality of addresses, the recording medium control device comprising:
- an address register for holding one of the plurality of addresses corresponding to one of the plurality of recording medium pieces on which information can be recorded;
- a selection circuit operably configured to generate one of a plurality of recording medium selection signals for output to the one of the plurality of recording medium pieces based on the one address held by the address register;
- a control circuit operably configured to output the one address held by the address register, the one recording medium selection signal, and a control signal to the one recording medium piece so as to carry out control with respect to the plurality of recording medium pieces;
- a control register having a value designating control with respect to the recording medium, the control circuit carrying out one of write control, read control, and erase control with respect to the recording medium on the basis of the value of the control register;
- a file segment counter operably configured to count when the control circuit outputs the one address held by the address register, the control circuit carrying out control with respect to the recording medium until the file segment counter counts to a predetermined value; and
- a file management means for managing a file recorded on the recording medium, the file management means having a predetermined value associated with the file, the control circuit setting the value of the address register on the basis of the predetermined value of the file management means, the control circuit changing the predetermined value of the file management means in accordance with a change of the file, the file segment counter counting each file segment written to the recording medium when write control is designated to the control register, the control circuit providing a count result from the file segment counter to the file management means so that the predetermined value associated with the file is changed.

75. A recording medium control device for use in association with a recording medium, the recording medium having a plurality of medium pieces on which information can be recorded, each of the plurality of recording medium pieces having a corresponding plurality of addresses, the recording medium control device comprising:
- an address register for holding one of the plurality of addresses corresponding to one of the plurality of recording medium pieces on which information can be recorded;
- a selection circuit operably configured to generate one of a plurality of recording medium selection signals for output to the one of the plurality of recording medium pieces based on the one address held by the address register;
- a control circuit operably configured to output the one address held by the address register, the one recording medium selection signal, and a control signal to the one recording medium piece so as to carry out control with respect to the plurality of recording medium pieces;
- a control register having a value designating control with respect to the recording medium, the control circuit carrying out one of write control, read control, and erase control with respect to the recording medium on the basis of the value of the control register; and
- a file segment counter operably configured to count when the control circuit outputs the one address held by the address register, the control circuit carrying out control with respect to the recording medium until the file segment counter counts to a predetermined value, the file segment counter counting a file segment having a size corresponding to a write unit when write control is designated to the control register, corresponding to a read unit when read control is designated to the control register, and corresponding to an erase unit when erase control is designated to the control register.

76. A recording medium control method comprising the steps of:
- receiving a starting address for a file from a file management means operable for managing the file;
- designating a control method with respect to the recording medium;
- determining an address from among a plurality of addresses corresponding to a recording medium to set in an address register based on the starting address, the count reflected by a file segment counter, and the designated control method, the recording medium having a plurality of recording medium pieces on which information can be recorded;
- setting an address register to hold the address;
- generating one of a plurality of recording medium selection signals on the basis of the address held by the address register, each of the plurality of recording medium selection signals corresponding to a respective one of the plurality of recording medium pieces;
- outputting the address, the one recording medium selection signal and a control signal to the respective one recording medium piece corresponding to the one recording medium selection signal so as to carry out control with respect to the plurality of recording medium pieces;
- updating the file segment counter when the control circuit outputs the address held by the address register, the file segment counter reflecting the quantity of segments of the file written to the recording medium when write control is the designated control method;
- carrying out one of write control, read control, and erase control with respect to the recording medium based on the designated control method until the file segment counter is updated to a predetermined value; and
- updating the address register to reflect a next address of the plurality of addresses corresponding to the recording medium after the control circuit outputs the address held by the address register; and
- providing the quantity reflected by the file segment counter to the file management means in response to an interruption in updating the file segment counter.

77. A recording medium control method comprising the steps of:
- setting an address register to hold an address from among a plurality of addresses corresponding to a recording medium, the recording medium having a plurality of recording medium pieces on which information can be recorded;
- generating one of a plurality of recording medium selection signals on the basis of the address held by the address register, each of the plurality of recording medium selection signals corresponding to a respective one of the plurality of recording medium pieces;

designating a control method with respect to the recording medium, and outputting the address, the one recording medium selection signal and a control signal to the respective one recording medium piece corresponding to the one recording medium selection signal so as to carry out control with respect to the plurality of recording medium pieces, updating a file segment counter when the control circuit outputs the address held by the address register, the file segment counter being updated to reflect the transfer of one of a plurality of segments of a file, each segment having a size based on a write unit when write control is designated to the control register, a read unit when read control is designated to the control register, and erase unit when erase control is designated to the control register; and carrying out one of write control, read control, and erase control with respect to the recording medium based on the designated control method until the file segment counter is updated to a predetermined value.

* * * * *